United States Patent
Niwa

(10) Patent No.: US 9,669,665 B2
(45) Date of Patent: Jun. 6, 2017

(54) PNEUMATIC TIRE

(71) Applicant: The Yokohama Rubber Co., LTD., Minato-ku, Tokyo (JP)

(72) Inventor: Masakazu Niwa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 243 days.

(21) Appl. No.: 14/433,246

(22) PCT Filed: Sep. 3, 2013

(86) PCT No.: PCT/JP2013/073618
§ 371 (c)(1),
(2) Date: Apr. 2, 2015

(87) PCT Pub. No.: WO2014/054365
PCT Pub. Date: Apr. 10, 2014

(65) Prior Publication Data
US 2015/0283864 A1    Oct. 8, 2015

(30) Foreign Application Priority Data
Oct. 3, 2012   (JP) ................................ 2012-221055

(51) Int. Cl.
*B60C 15/00* (2006.01)
*B60C 15/06* (2006.01)
(Continued)

(52) U.S. Cl.
CPC .............. *B60C 13/002* (2013.04); *B60C 5/00* (2013.01); *B60C 9/04* (2013.01); *B60C 9/09* (2013.01);
(Continued)

(58) Field of Classification Search
CPC . B60C 15/00; B60C 15/0009; B60C 15/0027; B60C 15/06; B60C 15/0603;
(Continued)

(56) References Cited

U.S. PATENT DOCUMENTS 3,044,523 A * 7/1962 Drakeford .............. B29D 30/48
152/541
2012/0325390 A1* 12/2012 Bourgeois ............... B60C 15/06
152/541

FOREIGN PATENT DOCUMENTS

EP        238679   * 9/1987
GB       1333195   * 10/1973
(Continued)

OTHER PUBLICATIONS

International Search Report for International Application No. PCT/JP2013/073618 dated Nov. 12, 2013, 4 pages, Japan.

*Primary Examiner* — Justin Fischer
(74) *Attorney, Agent, or Firm* — Thorpe North & Western

(57) ABSTRACT

A pneumatic tire has carcass layers mounted between a pair of bead parts, the carcass layers being wound from the inner side of the tire to the outer side thereof about a bead core of each bead part. Protective layers including organic fiber cords are positioned in sidewall parts on the outer side of the carcass layers. The upper end parts of the protective layers are positioned along the carcass layers from outer end locations of the belt layers, between a location 20 mm toward the inner side in the tire width direction and a location 15 mm toward the outer side in the tire width direction. The lower end parts of the protective layers are positioned between main body portions of the carcass layers and the bead filler.

17 Claims, 3 Drawing Sheets

(51) Int. Cl.
*B60C 13/00* (2006.01)
*B60C 9/09* (2006.01)
*B60C 9/14* (2006.01)
*B60C 5/00* (2006.01)
*B60C 9/04* (2006.01)
*B60C 11/03* (2006.01)
*B60C 11/11* (2006.01)

(52) U.S. Cl.
CPC .............. *B60C 9/14* (2013.01); *B60C 11/033* (2013.04); *B60C 11/11* (2013.01); *B60C 15/0009* (2013.04); *B60C 15/0603* (2013.04); *B60C 2015/061* (2013.04)

(58) Field of Classification Search
CPC ............ B60C 15/0607; B60C 15/0628; B60C 15/0632; B60C 15/0635; B60C 15/0653
See application file for complete search history.

(56) References Cited

FOREIGN PATENT DOCUMENTS

| | | | |
|---|---|---|---|
| JP | S62-004615 | | 1/1987 |
| JP | H07-290911 | | 11/1995 |
| JP | H11-020420 | | 1/1999 |
| JP | 2010-023607 | | 2/2010 |
| JP | 2010-120478 | | 6/2010 |
| WO | WO 00/05085 | * | 2/2000 |

* cited by examiner

PNEUMATIC TIRE

TECHNICAL FIELD

The present technology relates to a pneumatic tire suitable as a tire for traveling on unpaved roads; and particularly relates to a pneumatic tire which improves resistance to cutting based on a protective layer positioned on sidewall parts, and which is able to effectively avoid internal faults caused by peeling of the protective layer and carcass layers and improve resilience.

BACKGROUND

Pneumatic tires for traveling on unpaved roads are easily damaged in the sidewall parts. For this reason, proposals have been made regarding pneumatic tires used for such an application for preventing side cutting due to contact with rocks, sharp stones, or the like, and preventing punctures caused by the side cutting by embedding a protective layer, which includes a plurality of organic fiber cords, in sidewall parts along the carcass layers (for example, refer to Japanese Unexamined Patent Application Publication No. H07-290911A).

However, in a case where a pneumatic tire provided with the protective layer in the sidewall parts as described above is used under high load conditions, there is a problem in that internal faults caused by peeling between the protective layer and the carcass layers are easily generated.

SUMMARY

The present technology provides a pneumatic tire, whereby resistance to cutting is improved based on a protective layer positioned on sidewall parts, and it is possible to effectively avoid internal faults caused by peeling between the protective layer and carcass layers and improve resilience.

A pneumatic tire of the present technology is provided with a tread part with an annular shape extending in a tire circumferential direction, a pair of sidewall parts positioned on each side of the tread parts, and a pair of bead parts positioned on an inner side of the sidewall parts in a tire radial direction. At least one carcass layer is mounted between the pair of bead parts in the pneumatic tire, the carcass layer is wound from an inner side of the tire to an outer side thereof about a bead core of each of the bead parts, bead fillers are positioned on an outer circumference side of the bead cores, and a plurality of belt layers is positioned on an outer circumference side of the carcass layer in the tread part.

Furthermore, a protective layer including organic fiber cords is positioned on an outer side of the carcass layer in the sidewall parts, upper end parts of the protective layer are positioned between a location 20 mm toward the inner side in the tire width direction and a location 15 mm toward the outer side in the tire width direction from an outer end location of the belt layers along the carcass layer, lower end parts of the protective layer are positioned between a main body portion of the carcass layer and the bead filler with an overlap length between the protective layer and the bead filler of 10 mm or greater, and a rubber layer with a thickness from 0.5 mm to 2.0 mm and a tan δ at 60° C. of 0.12 or less are interposed between the protective layer and the main body portion of the carcass layer.

In the present technology, since the protective layer including organic fiber cords is positioned in sidewall parts on the outer side of carcass layers, it is possible to improve resistance to cutting based on the protective layer. For this reason, it is possible to prevent side cutting due to contact with rocks, sharp stones, or the like, and to prevent punctures caused by the side cutting.

In addition, changes in the shape are suppressed at the upper end parts of the protective layer by positioning the upper end parts of the protective layer in the vicinity of an outer end location of the belt layers, while it is possible to suppress changes in the shape at the lower end parts of the protective layer by positioning the lower end parts of the protective layer between the main body portion of the carcass layer and the bead filler. By suppressing changes in the shape of the protective layer in this manner in the upper end parts and the lower end parts, it is possible to effectively prevent peeling between the protective layer and the carcass layer. Furthermore, by the interposing rubber layer with a low heat generation property between the protective layer and the main body portion of the carcass layer, even in a case where the pneumatic tires are used under high load conditions, it is possible to improve the resilience by effectively avoiding internal faults caused by peeling between the protective layer and the carcass layer.

In the present technology, it is preferable that the intermediate elongation of the organic fiber cords of the protective layer be less than the intermediate elongation of reinforcing cords of the carcass layer, and a difference between both intermediate elongations be 3% or greater. Due to this, it is possible to ensure an excellent resistance to cutting based on the protective layer.

It is preferable that the angle of the organic fiber cords of the protective layer with respect to the tire radial direction be set to from 0° to 60° at a tire maximum width location. Meanwhile, it is preferable that the angle of the reinforcing cords of the carcass layer with respect to the tire radial direction be set to from 4° to 30° at the tire maximum width location. When the cord angle of the protective layer or the carcass layer is excessively increased, the resilience decreases along with an increase in the rigidity. However, it is possible to suppress the decrease in the resilience by setting the cord angles in the ranges described above.

It is preferable that the height of the bead fillers be from 30 mm to 90 mm and the apex of the bead fillers be positioned further to the inner side in the tire radial direction than the tire maximum width location. Due to this, it is possible to form a tire structure suitable as a tire for traveling on unpaved roads.

The uses of the pneumatic tire of the present technology are not limited; however, the tire is suitable for traveling on unpaved roads or for racing. In the case of a tire for traveling on unpaved roads, it is preferable that the tread parts have a plurality of grooves, and the groove surface area ratio of the tread parts be from 25% to 55%.

Tan δ in the present technology is measured under conditions of frequency 20 Hz, initial strain 10%, dynamic strain ±2%, and temperature 60° C. using a viscoelasticity spectrometer (manufactured by Toyo Seiki Seisaku-Sho, Ltd.) in compliance with JIS-K6394.

In addition, the intermediate elongation in the present technology is the elongation rate under a constant load measured using a tensile tester in compliance with JIS-L1017. Here, the constant load (F) is provided by the following formula.

$$F=44\times(d2/d1)$$

F: Constant load (N: Newton)
d1: Reference fineness (dtex) defined in JIS-L1017
d2: Display fineness (dtex) of the sample to be measured Furthermore, the groove area ratio in the present technology is a ratio of the groove area in the grounding region with respect to the grounding region of the tread parts. The grounding region of the tread parts is specified based on the ground contact width in the tire axis direction measured when a regular load is added by being placed vertically on a flat plane in a state where the tire is assembled with a regular rim and filled with a regular internal pressure. "Regular rim" is a rim defined by a standard for each tire according to a system of standards that includes standards on which tires are based, and refers to a "standard rim" in the case of JATMA, refers to a "design rim" in the case of TRA, and refers to a "measuring rim" in the case of ETRTO. "Regular inner pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "inflation pressure" in the case of ETRTO. "Regular inner pressure" is 180 kPa for a tire on a passenger vehicle. "Regular load" is the load defined by the standard for each tire according to a system of standards that includes standards on which tires are based, and refers to the load defined as the maximum load capacity in the case of JATMA, the load defined as the maximum value in the table of "TIRE ROAD LIMITS AT VARIOUS COLD INFLATION PRESSURES" in the case of TRA, or the load defined as the "load capacity" in the case of ETRTO; the "regular load" for a tire on a passenger vehicle being 88% thereof.

DETAILED DESCRIPTION

Figure 1:
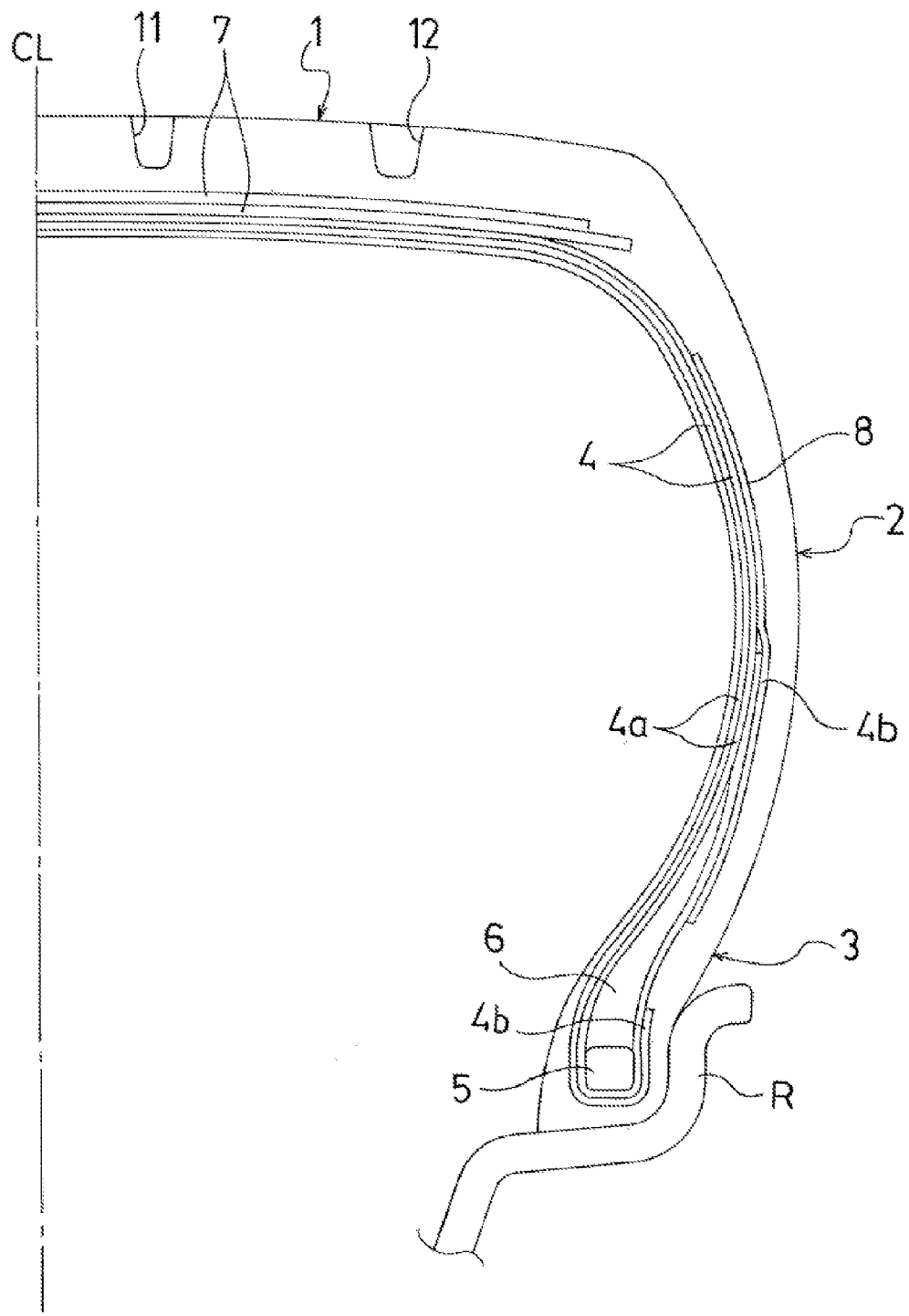
FIG. 1 is a meridian cross-sectional view illustrating a pneumatic tire according to an embodiment of the present technology.

The following is a detailed description of the configuration of the present technology with reference to the accompanying drawings. FIG. 1 shows a pneumatic tire according to an embodiment of the present disclosure. In FIG. 1, the pneumatic tire according to the present embodiment is depicted as the portion on one side bounded by the tire center line CL, however the pneumatic tire has a symmetrical structure on both sides of the tire center line CL. Also, R is the rim of a wheel on which the pneumatic tire is assembled.

As illustrated in FIG. 1, a pneumatic tire of the present embodiment is provided with a tread part 1 extending in the tire circumferential direction to form an annular shape, a pair of sidewall parts 2 that is positioned on each side of the tread part 1, and a pair of bead parts 3 that is positioned on the inner side in the tire radial direction of the sidewall parts 2.

Two layers of a carcass layer 4 are mounted between the pair of bead parts 3,3. The carcass layer 4 includes a plurality of reinforcing cords that incline with respect to the tire radial direction and the reinforcing cords are disposed between the layers so as to intersect each other. In the carcass layers 4, the inclination angle of the reinforcing cords with respect to the tire radial direction is set to a range of, for example, 4° to 30° at a tire maximum width location Pmax. By employing such a half radial structure, it is possible to ensure a rigidity suitable for a tire for traveling on unpaved roads. When the inclination angle of the reinforcing cords of the carcass layers 4 with respect to the tire radial direction is excessive, resilience is decreased due to an excessive increase in rigidity. The carcass layer 4 is folded back around a bead core 5 disposed in each of the bead parts 3 from the tire inner side to the tire outer side. Due to this, in each of the carcass layers 4, a main body portion 4a and a wound portion 4b are formed as the boundary of the bead cores 5. Organic fiber cords such as nylon and polyester are preferably used as the reinforcing cords of the carcass layers 4. In addition, the bead fillers 6 formed of a rubber composition with a triangular shaped cross-section are positioned on the outer periphery of the bead cores 5.

On the other hand, a plurality of layers of a belt layer 7 is embedded on an outer circumferential side of the carcass layer 4 in the tread part 1. These belt layers 7 include a plurality of reinforcing cords that incline with respect to the tire circumferential direction and the reinforcing cords are disposed between the layers so as to intersect each other. In the belt layers 7, an inclination angle of the reinforcing cords with respect to the tire circumferential direction is set in a range of, for example, 10° to 40°. Steel cords are preferably used as the reinforcing cords of the belt layers 7.

For the purpose of enhancing high-speed durability, at least one layer of a belt cover layer formed by arranging reinforcing cords at an angle of not greater than 5° with respect to the tire circumferential direction, may be disposed on the outer circumferential side of the belt layers 7. The belt cover layer preferably has a jointless structure in which a strip material made from a single reinforcing cord laid in parallel and covered with rubber is wound continuously in the tire circumferential direction. Also, the belt cover layer can be disposed so as to cover the belt layer 7 in the width direction at all positions, or can be disposed to cover only the edge portions of the belt layer 7 to the outside in the width direction. Nylon, aramid, or similar organic fiber cords are preferably used as the reinforcing cords of the belt cover layer.

In the pneumatic tire described above, a protective layer 8 including a plurality of organic fiber cords aligned in parallel is embedded in the sidewall parts 2 on the tire width direction outer side of the carcass layers 4. Upper end parts 8a of the protective layer 8 are positioned in the vicinity of the outer end location of the belt layers 7. More specifically, when a reference line P0 is drawn in the tire meridian section to pass through the outer end location of the belt layers 7 orthogonally to the carcass layers 4, the upper end parts 8a of the protective layer 8 are positioned between a location P1 where a distance A to the inner side in the tire width direction measured along the carcass layers 4 from the outer end location of the belt layers 7 specified based on the reference line P0 is 20 mm, more preferably, 15 mm, and a location P2 where a distance B to the outer side in the tire width direction measured along the carcass layers 4 from the outer end location of the belt layers 7 specified based on the reference line P0 is 15 mm, more preferably, 10 mm. On the other hand, lower end parts 8b of the protective layer 8 are positioned between the main body portion 4a of the carcass layers 4 and the bead filler 6 and an overlap length C between the protective layer 8 and the bead filler 6 is set to be 10 mm or greater, more preferably, from 15 mm to 25 mm. In particular, it is desirable that the lower end parts 8b of the protective layer 8 be interposed between the main body portion 4a and the wound portion 4b of the carcass layers 4.

A rubber layer 9 with a low heat generation property is inserted between the protective layer 8 and the main body portion 4a of the carcass layers 4. The rubber layer 9 is positioned in a range which is wider than the protective layer 8 such that the protective layer 8 does not directly touch the main body portion 4a of the carcass layers 4. In addition, the rubber layer 9 has a thickness from 0.5 mm to 2.0 mm and a tan δ at 60° C. of 0.12 or less.

In the pneumatic tire described above, since the protective layer 8 including the organic fiber cords is positioned in the sidewall parts 2 on the outer side of the carcass layers 4, it is possible to improve the resistance to cutting based on the protective layer 8. For this reason, it is possible to prevent side cutting due to contact with rocks, sharp stones, or the like, and to prevent punctures caused by the side cutting.

In addition, changes in the shape of the protective layer in the upper end parts 8a are suppressed by positioning the upper end parts 8a of the protective layer 8 in the vicinity of the outer end location of the belt layers 7, while it is possible to suppress changes in the shape of the protective layer 8 in the lower end parts 8b by positioning the lower end parts 8b of the protective layer 8 between the main body portion 4a of the carcass layers 4 and the bead filler 6. By suppressing changes in the shape at the upper end parts 8a and the lower end parts 8b of the protective layer 8 in this manner, it is possible to effectively prevent peeling between the protective layer 8 and the carcass layers 4.

Here, when the upper end parts 8a of the protective layer 8 are positioned further to the inner side in the tire width direction than the location P1 described above, internal faults are easily generated due to interference between the protective layer 8 and the belt layers 7. Also, when the upper end parts 8a of the protective layer 8 are positioned further to the bead parts 3 side than the location P2 described above, internal faults are easily generated since the resistance to cutting is decreased and the movement of the upper end parts 8a of the protective layer 8 increases. In addition, in a case where the lower end parts 8b of the protective layer 8 are not positioned between the main body portion 4a of the carcass layers 4 and the bead filler 6, or a case where the overlap length C between the protective layer 8 and the bead filler 6 is excessively short, internal faults are easily generated since the resistance to cutting is decreased and the movement of the lower end parts 8b of the protective layer 8 increases.

In addition, in the pneumatic tire described above, since the rubber layer 9 with a low heat generation property is interposed between the protective layer 8 and the carcass layers 4, even in a case where the pneumatic tire is used under high load conditions, it is possible to improve the resilience by effectively avoiding internal faults caused by peeling between the protective layer 8 and the carcass layers 4.

Here, when the thickness of the rubber layer 9 is less than 0.5 mm, the effect of improving the resilience is insufficient, and in contrast, when the thickness exceeds 2.0 mm, peeling faults are easily generated due to the rigidity difference between the protective layer 8 and the carcass layers 4. The thickness of the rubber layer 9 may be set to from 1.0 mm to 1.5 mm. In addition, when tan δ at 60° C. of the rubber layer 9 exceeds 0.12, the effect of improving the resilience is insufficient. Tan δ at 60° C. of the rubber layer 9 may be set to 0.10 or less.

In the pneumatic tire described above, the intermediate elongation of the organic fiber cords of the protective layer 8 is less than the intermediate elongation of the reinforcing cords of the carcass layers 4 and the difference between both intermediate elongations may be set to be 3% or greater. Due to this, it is possible to ensure excellent resistance to cutting based on the protective layer 8. Here, when the difference between the intermediate elongation of the organic fiber cords of the protective layer 8 and the intermediate elongation of the reinforcing cords of the carcass layers 4 is less than 3%, the protective effect based on the protective layer 8 is decreased. In addition, the intermediate elongation of the organic fiber cords of the protective layer 8 may be set to a range of 0.5% to 4.0%.

Examples of the organic fiber cords used in the protective layer 8 include nylon fiber cords, polyester fiber cords, aramid fiber cords, and the like. However, in particular, it is desirable to use aramid fiber cords with high strength and a high elastic modulus. In addition, the total fineness of the aramid fiber cords may be set to a range of 3000 dtex to 4000 dtex. Aramid fiber cords having such a total fineness are suitable as a reinforcing material for the protective layer 8 described above. In addition, it is preferable that the implantation density of the aramid fiber cords configuring the protective layer 8 be set to from 25 cords/50 mm to 55 cords/50 mm. Due to this, it is possible to sufficiently obtain the effect of improving the resistance to cutting.

The angle of the organic fiber cords of the protective layer 8 with respect to the tire radial direction may be set to a range of 0° to 60° at a tire maximum width location Pmax, more preferably, 20° to 40°. When the cord angle of the protective layer 8 with respect to the tire radial direction is excessively increased, the resilience decreases along with an increase in the rigidity. However, it is possible to suppress the decrease in the resilience by setting the cord angle to the range described above.

In addition, a height H of the bead fillers 6 in the tire radial direction is set to a range of 30 mm to 90 mm, more preferably, to a range of 40 mm to 70 mm, and the apex of the bead fillers 6 may be positioned further to the inner side in the tire radial direction than the tire maximum width location Pmax. Due to this, it is possible to form a tire structure suitable as a tire for traveling on unpaved roads. When the bead fillers 6 are excessively high, the resilience is decreased since the tire side rigidity is increased, and in contrast, when the bead fillers 6 are excessively low, the rigidity about the beads is decreased and steering stability is decreased.

In the pneumatic tire according to the embodiment as described above, the carcass layer has a two-layer structure, and these carcass layers are disposed so that the reinforcing cords intersect between layers, and this type of carcass structure has high rigidity and is effective for traveling on unpaved roads or for competitions such as races or the like. However, the present technology may be applied not only to pneumatic tires having the bias structure as described above, but can also be applied to pneumatic tires having a radial structure that has a single layer structure in the carcass layer where the carcass layer has the reinforcing cords disposed extending in the tire radial direction. In either case, the pneumatic tire described above is suitable for traveling on unpaved roads or for racing. Usually, the external diameter of tires for racing is set to a range of 32 inches to 42 inches.

Figure 2:
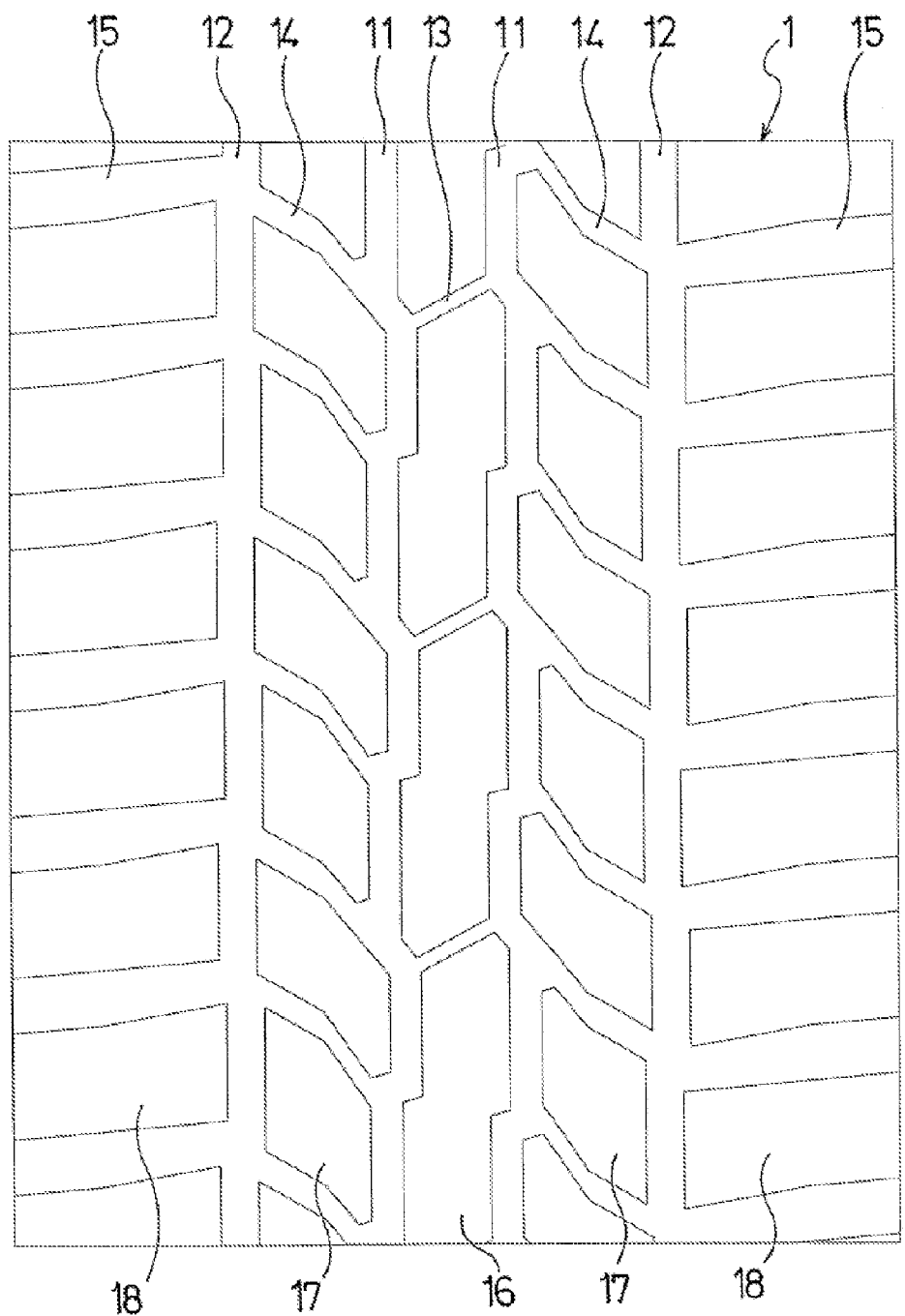
FIG. 2 is an exploded view illustrating a tread pattern of the pneumatic tire of FIG. 1.

FIG. 2 illustrates a tread pattern of the pneumatic tire described above. As shown in FIG. 2, a plurality of circumferential grooves 11 and 12 extending in the tire circumferential direction and a plurality of lateral grooves 13, 14, and 15 extending in the tire width direction are formed in the tread part 1, and a plurality of blocks 16, 17, and 18 is partitioned by these circumferential grooves 11 and 12 and lateral grooves 13 to 15. Two circumferential grooves 11 on the tire equatorial side extend in a zigzag shape along the tire circumferential direction and two of the circumferential grooves 12 on the shoulder side extend in a straight manner along the tire circumferential direction. The circumferential direction pitch of the lateral groove 13 which partitions the block 16 located on the tire equator is greater than the circumferential direction pitch of the lateral grooves 14 and 15 which partition the other blocks 17 and 18, more specifically, set to approximately two times greater. In addition, while the lateral groove 15 which partitions the shoulder block 18 extends substantially in parallel with the tire width direction, the inclination angle of the lateral groove 14 which partitions the center block 17 with respect to the tire circumferential direction is less than the inclination angle of the lateral groove 15 with respect to the tire circumferential direction. Such a tread pattern is preferably applied to tires for traveling on unpaved roads; however, the pneumatic tire according to the present technology is not limited to the tread pattern in FIG. 2.

In the case of tires for traveling on unpaved roads, a plurality of grooves including, for example, the circumferential grooves 11 and 12 and the lateral grooves 13 to 15 is formed in the tread part 1, and it is best to set the groove area ratio of the tread part 1 to a range of 25% to 55%. By selecting such a groove area ratio, it is possible to sufficiently exhibit a traveling performance on unpaved roads. When the groove area ratio of the tread part 1 is less than 25%, the traveling performance on muddy ground or sand is insufficient, and when the groove area ratio exceeds 55%, the traction is insufficient on rock or the like as the rigidity of the tread part 1 is decreased, and problems such as block chipping are easily generated.

EXAMPLES

Figure 3:
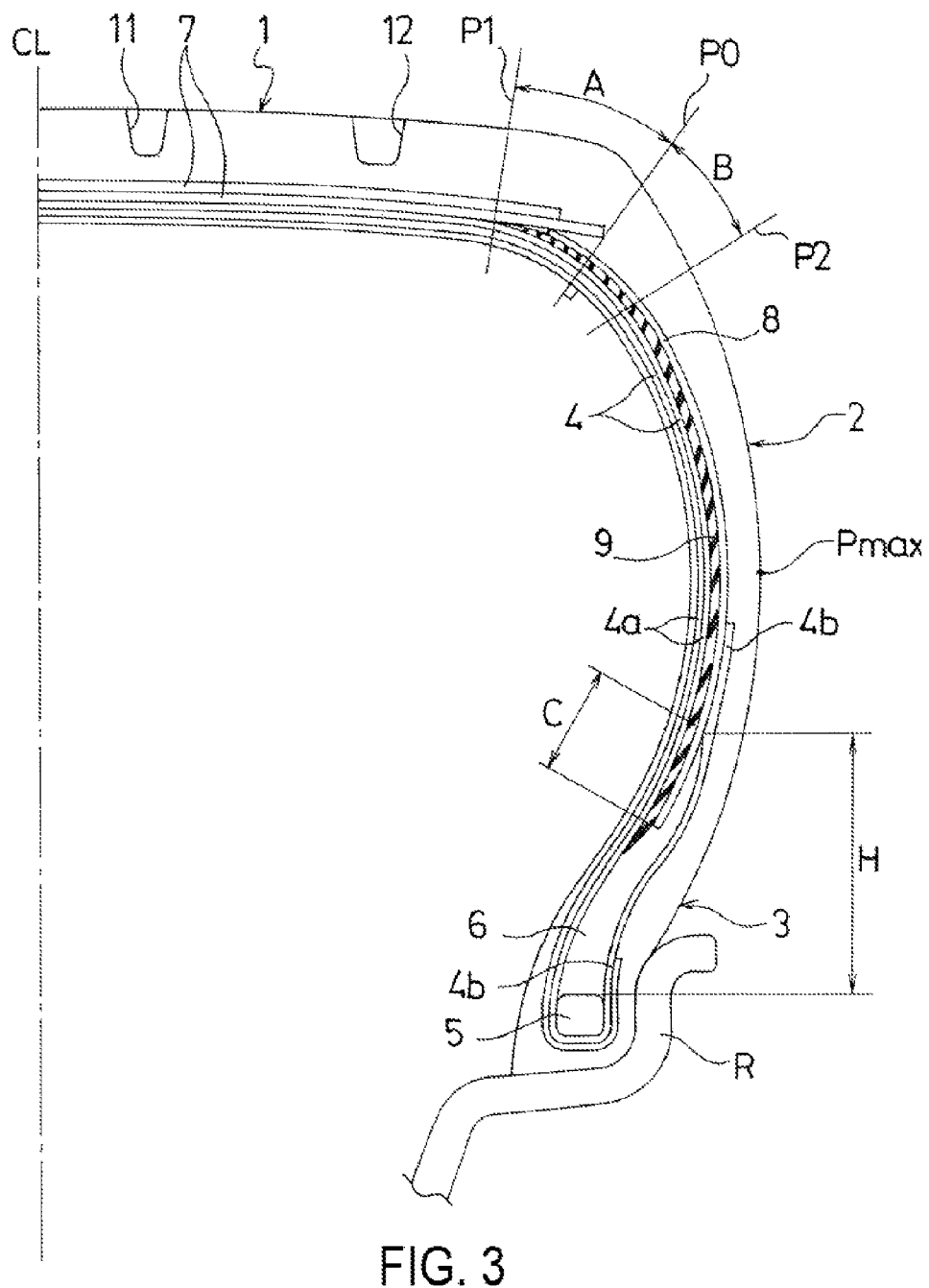
FIG. 3 is a meridian cross-sectional view illustrating a conventional pneumatic tire.

Tires of a Conventional Example 1 (FIG. 3), Examples 1 to 5 (FIG. 1) and Comparative Examples 1 to 7 were manufactured. In these tires, with a tire size of 35×12.50R17, two carcass layers were mounted between a pair of bead parts, the carcass layers were wound from an inner side of the tire to an outer side thereof about a bead core of each of the bead parts, bead fillers were positioned on the outer circumference side of the bead cores, two belt layers were positioned on an outer circumference side of the carcass layers in the tread part, and two belt cover layers were positioned on an outer circumference side of the belt layers. In these pneumatic tires, a protective layer including organic fiber cords was positioned on the outer side of the carcass layers in the sidewall parts, and the upper end parts location and the lower end parts location of the protective layer, the overlap length of the protective layer with the bead filler, the angle of the organic fiber cords of the protective layer with respect to the tire radial direction, the presence or absence of rubber layers inserted between the protective layer and the carcass layer, the thickness and tan δ of the rubber layers, were set as in Table 1.

Regarding the location of the upper end parts of the protective layer, a distance from the outer end location of the belt layers up to the upper end parts of the protective layer measured along the carcass layers is shown, a case where the upper end parts of the protective layer are further to the inner side in the tire width direction than the outer end location of the belt layers is denoted as a positive value, and a case where the upper end parts of the protective layer are further to the bead part side than the outer end location of the belt layers is denoted as a negative value. In addition, regarding the location of the lower end parts of the protective layer, cases where the lower end parts of the protective layer were positioned between the main body portion of the carcass layers and the bead filler are denoted as the "inner side", and cases where the lower end parts of the protective layer were positioned on the outer side of the wound portion of the carcass layers are denoted as the "outer side".

In each of the test tires, a layer where 66 nylon fiber cords (1400 dtex/2) were arranged at an implantation density of 55 cords/50 mm was used as the carcass layer, layers where steel cords (2+2×0.25 mm) were arranged at an implantation density of 40 cords/50 mm were used as the belt layers, and a layer where 66 nylon fiber cords (940 dtex/2) were arranged at an implantation density of 50 cords/50 mm was used as the belt cover layer.

In addition, a layer where aramid fiber cords (1670 dtex/2) were arranged at an implantation density of 35 cords/50 mm was used in the protective layer. While the intermediate elongation of the 66 nylon fiber cords configuring the carcass layers was 8.5%, the intermediate elongation of the aramid fiber cords configuring the protective layer was 1.5%.

Furthermore, the angle of the reinforcing cords of the carcass layers with respect to the tire radial direction was set to 30°, the height of the bead fillers was set to 50 mm, and the groove area ratio of the tread part was set to 37%.

For these test tires, external damage and internal faults were evaluated using the following evaluation method and the results are shown together in Table 1.

External Damage:

Each of the test tires was mounted on an exclusively off-road racing pickup truck (rear-wheel-drive vehicle) by being assembled with a wheel with a rim size of 17×11 JJ and a test driver traveled a distance of 160 km on an off-road (unpaved roads) test course and a mountain course (a mountain road interspersed with rocks and sharp stones) used for testing under conditions of an air pressure of 180 kPa. After traveling, a visual inspection was carried out regarding the status of external damage occurring in the shoulder section, the side section, and the bead parts. In the evaluation results, a case where there was absolutely no external damage is denoted as "1", a case where a crack with a length of 10 mm or less occurred is denoted as "2", a case where a crack with a length of over 10 mm which did not damage the carcass layers occurred is denoted as "3", a case where a crack which caused damage to the carcass layers occurred is denoted as "4", and a case of bursting or where traveling was not possible is denoted as "5". That is, this means that the resistance to cutting is better as the evaluation value of the external damage is less.

Internal faults:

After inspecting the external faults described above, the tires were disconnected, and visual inspection was carried out regarding the status of internal faults (separation) occurring in the shoulder section, the side section, and the bead part. In the evaluation results, a case where there were absolutely no internal faults is denoted as "1", a case where a separation with a length of 10 mm or less occurred between the protective layer and the carcass layers is denoted as "2", a case where a separation with a length of 50 mm or less occurred between the protective layer and the carcass layers is denoted as "3", a case where a separation with a length of over 50 mm occurred between the protective layer and carcass layers is denoted as "4", and a case of bursting or where traveling was not possible is denoted as "5".

TABLE 1

|  |  | Conventional Example 1 | Working examples 1 | Working examples 2 |
|---|---|---|---|---|
| Upper end parts location of protective layer (mm) |  | −40 | +10 | +20 |
| Lower end parts location of protective layer (mm) |  | Outer side | Inner side | Inner side |
| Overlap length of protective layer (mm) |  | 20 | 20 | 15 |
| Cord angle of protective layer (°) |  | 30 | 30 | 30 |
| Presence or absence of rubber layer |  | Absent | Present | Present |
| Thickness of rubber layer (mm) |  | — | 1.5 | 1.0 |
| tanδ of rubber layer |  | — | 0.12 | 0.12 |
| External damage | Shoulder section | 4 | 2 | 2 |
|  | Side section | 2 | 1 | 1 |
|  | Bead parts | 1 | 1 | 1 |
| Internal faults | Shoulder section | 4 | 1 | 2 |
|  | Side section | 2 | 1 | 2 |
|  | Bead parts | 3 | 2 | 1 |
|  |  | Working examples 3 | Working examples 4 | Working examples 5 |
| Upper end parts location of protective layer (mm) |  | −15 | −10 | +10 |
| Lower end parts location of protective layer (mm) |  | Inner side | Inner side | Inner side |
| Overlap length of protective layer (mm) |  | 20 | 30 | 25 |
| Cord angle of protective layer (°) |  | 60 | 30 | 30 |
| Presence or absence of rubber layer |  | Present | Present | Present |
| Thickness of rubber layer (mm) |  | 2.0 | 0.5 | 1.5 |
| tanδ of rubber layer |  | 0.12 | 0.12 | 0.12 |
| External damage | Shoulder section | 2 | 2 | 2 |
|  | Side section | 2 | 2 | 1 |
|  | Bead parts | 1 | 1 | 1 |
| Internal faults | Shoulder section | 2 | 1 | 1 |
|  | Side section | 2 | 2 | 2 |
|  | Bead parts | 1 | 2 | 1 |
|  |  | Comparative example 1 | Comparative example 2 | Comparative example 3 |
| Upper end parts location of protective layer (mm) |  | +25 | −20 | +15 |
| Lower end parts location of protective layer (mm) |  | Inner side | Inner side | Inner side |
| Overlap length of protective layer (mm) |  | 5 | 20 | 20 |
| Cord angle of protective layer (°) |  | 30 | 30 | 30 |
| Presence or absence of rubber layer |  | Present | Present | Present |
| Thickness of rubber layer (mm) |  | 1.5 | 1.5 | 0.3 |
| tanδ of rubber layer |  | 0.12 | 0.12 | 0.12 |
| External damage | Shoulder section | 2 | 3 | 2 |
|  | Side section | 1 | 2 | 1 |
|  | Bead parts | 2 | 1 | 1 |
| Internal faults | Shoulder section | 3 | 4 | 2 |
|  | Side section | 1 | 2 | 4 |
|  | Bead parts | 4 | 1 | 2 |

Comparative Comparative Comparative Comparative

TABLE 1-continued

|  | example 4 | example 5 | example 6 | example 7 |
|---|---|---|---|---|
| Upper end parts location of protective layer (mm) | +15 | +15 | +15 | +10 |
| Lower end parts location of protective layer (mm) | Inner side | Inner side | Inner side | Inner side |
| Overlap length of protective layer (mm) | 20 | 20 | 20 | 20 |
| Cord angle of protective layer (°) | 30 | 30 | 70 | 30 |
| Presence or absence of rubber layer | Present | Absent | Present | Present |
| Thickness of rubber layer (mm) | 2.5 | — | 0.3 | 1.5 |
| tanδ of rubber layer | 0.12 | — | 0.12 | 0.20 |
| External damage — Shoulder section | 2 | 2 | 2 | 2 |
| External damage — Side section | 1 | 1 | 1 | 1 |
| External damage — Bead parts | 1 | 1 | 1 | 1 |
| Internal faults — Shoulder section | 3 | 3 | 3 | 3 |
| Internal faults — Side section | 4 | 4 | 4 | 3 |
| Internal faults — Bead parts | 2 | 3 | 4 | 2 |

As seen from Table 1, the tires of Working Examples 1 to 5 had less external damage and fewer internal faults in comparison with Conventional Example 1. On the other hand, for the tires of Comparative Examples 1 to 7, since the setting conditions of the protective layer or the rubber layer were not appropriate, it was not possible to sufficiently suppress the external damage or the internal faults and the resilience was not sufficient.

What is claimed is:

1. A pneumatic tire, comprising:
a tread part with an annular shape extending in a tire circumferential direction;
a pair of sidewall parts positioned on each side of the tread parts; and
a pair of bead parts positioned on an inner side of the sidewall parts in a tire radial direction;
at least one carcass layer being mounted between the pair of bead parts in the pneumatic tire;
the carcass layer being wound from an inner side of the tire to an outer side thereof about a bead core of each of the bead parts;
bead fillers being positioned on an outer circumference side of the bead cores;
a plurality of belt layers being positioned on an outer circumference side of the carcass layer in the tread part;
a protective layer including organic fiber cords being positioned on an outer side of the carcass layer in the sidewall parts;
upper end parts of the protective layer being positioned between a location 20 mm toward the inner side in the tire width direction and a location 15 mm toward the outer side in the tire width direction from an outer end location of the belt layers along the carcass layer;
lower end parts of the protective layer being positioned between a main body portion of the carcass layer and the bead filler with an overlap length between the protective layer and the bead filler of 10 mm or greater; and
a rubber layer with a thickness from 0.5 mm to 2.0 mm and a tan δ at 60° C. of 0.12 or less being interposed between the protective layer and the main body portion of the carcass layer.

2. The pneumatic tire according to claim 1, wherein an intermediate elongation of the organic fiber cords of the protective layer is less than an intermediate elongation of reinforcing cords of the carcass layer, and a difference between both intermediate elongations is 3% or greater.

3. The pneumatic tire according to claim 1, wherein an angle of the organic fiber cords of the protective layer with respect to the tire radial direction is set to from 0° to 60° at a tire maximum width location.

4. The pneumatic tire according to claim 1, wherein an angle of the reinforcing cords of the carcass layer with respect to the tire radial direction is set to from 4° to 30° at the tire maximum width location.

5. The pneumatic tire according to claim 1, wherein a height of the bead fillers is from 30 mm to 90 mm and an apex of the bead fillers is positioned further to the inner side in the tire radial direction than the tire maximum width location.

6. The pneumatic tire according to claim 1, wherein the tire is a tire for traveling on unpaved roads in which the tread parts have a plurality of grooves, and a groove surface area ratio of the tread parts is from 25% to 55%.

7. The pneumatic tire according to claim 1, wherein the tire is a racing tire.

8. The pneumatic tire according to claim 2, wherein an angle of the organic fiber cords of the protective layer with respect to the tire radial direction is set to from 0° to 60° at a tire maximum width location.

9. The pneumatic tire according to claim 8, wherein an angle of the reinforcing cords of the carcass layer with respect to the tire radial direction is set to from 4° to 30° at the tire maximum width location.

10. The pneumatic tire according to claim 2, wherein an angle of the reinforcing cords of the carcass layer with respect to the tire radial direction is set to from 4° to 30° at the tire maximum width location.

11. The pneumatic tire according to claim 4, wherein a height of the bead fillers is from 30 mm to 90 mm and an apex of the bead fillers is positioned further to the inner side in the tire radial direction than the tire maximum width location.

12. The pneumatic tire according to claim 3, wherein a height of the bead fillers is from 30 mm to 90 mm and an apex of the bead fillers is positioned further to the inner side in the tire radial direction than the tire maximum width location.

13. The pneumatic tire according to claim 2, wherein a height of the bead fillers is from 30 mm to 90 mm and an apex of the bead fillers is positioned further to the inner side in the tire radial direction than the tire maximum width location.

14. The pneumatic tire according to claim 5, wherein the tire is a tire for traveling on unpaved roads in which the tread parts have a plurality of grooves, and a groove surface area ratio of the tread parts is from 25% to 55%.

15. The pneumatic tire according to claim 4, wherein the tire is a tire for traveling on unpaved roads in which the tread parts have a plurality of grooves, and a groove surface area ratio of the tread parts is from 25% to 55%.

16. The pneumatic tire according to claim 3, wherein the tire is a tire for traveling on unpaved roads in which the tread parts have a plurality of grooves, and a groove surface area ratio of the tread parts is from 25% to 55%.

17. The pneumatic tire according to claim 2, wherein the tire is a tire for traveling on unpaved roads in which the tread parts have a plurality of grooves, and a groove surface area ratio of the tread parts is from 25% to 55%.

* * * * *